United States Patent [19]

Carroll

[11] 4,221,083
[45] Sep. 9, 1980

[54] HEAT SHIELD BLOCKING AND MOUNTING DISC FOR LENS GRINDING

[75] Inventor: Thomas J. Carroll, North Merrick, N.Y.

[73] Assignee: Valley Industrial Products, Syosset, N.Y.

[21] Appl. No.: 866,782

[22] Filed: Jan. 3, 1978

Related U.S. Application Data

[63] Continuation of Ser. No. 729,427, Oct. 4, 1976, abandoned.

[51] Int. Cl.² ............................................... B24B 1/00
[52] U.S. Cl. .............................. 51/284 R; 51/216 LP; 51/277
[58] Field of Search ................. 51/216 LP, 277, 284; 428/40, 354, 355

[56] References Cited

U.S. PATENT DOCUMENTS

| | | | |
|---|---|---|---|
| 2,607,711 | 8/1952 | Hendricks | 428/40 |
| 3,197,326 | 7/1965 | Webber | 428/355 X |
| 3,404,488 | 10/1968 | Cox | 51/277 |
| 3,490,182 | 1/1970 | Lanman | 51/216 LP |
| 3,925,271 | 12/1975 | Balinth | 428/355 |
| 3,962,833 | 6/1976 | Johnson | 51/216 LP |
| 3,996,701 | 12/1976 | Ramirez | 51/271 |

Primary Examiner—Harold D. Whitehead
Attorney, Agent, or Firm—Kenyon & Kenyon

[57] ABSTRACT

A heat shield and blocking disc for use in lens grinding which comprises a carrier layer of flexible optical transparent plastic having transparent adhesive coatings on both sides thereof, one of which is adapted to stick to a plastic lens blank but to be stripped therefrom with a minimum of residue with the other adhesive compatible with the normal alloy used in blocking glass lens blanks, permitting a simpler blocking of plastic lenses and the use of the normal alloy, thereby reducing the cost of the process.

4 Claims, 5 Drawing Figures

HEAT SHIELD BLOCKING AND MOUNTING DISC FOR LENS GRINDING

This is a continuation, of application Ser. No. 729,427, filed Oct. 4, 1976, now abandoned.

BACKGROUND OF THE INVENTION

This invention relates to lens grinding in general and more particularly to a blocking and mounting disc which provides heat shield protection which is particularly useful in grinding plastic lenses.

In former times, all lenses were made of glass. In the prescription eyewear field in particular, plastic lenses are now becoming quite popular because of their lightness and impact resistance. A common type of material used in such eyeglass lenses is a material known as CR-39, a registered trademark of P.P.G. Industries for an allyl diglycol carbonate monomer. The manner in which lens blanks made of this material are processed is described in detail in a booklet put out by P.P.G. Industries entitled "How to Surface Optical Plastic Lenses for Prescription Eyewear" [1975 P.P.G. Industries, Inc., Pittsburgh, Pa.]. In general, these steps include, after checking the prescription and selecting a proper blank, marking an axis on the lens to facilitate surface blocking, blocking the lens, i.e., placing it on a block to which it remains mounted during the subsequent processing, carrying out a step of generating in which special diamond wheels are used to remove large amounts of material and then carrying out a number of fining operations and polishing operations to obtain the final polished lens after which the lens is de-blocked. More detail regarding the various processes can be had from the aforementioned booklet. The present invention deals primarily with the blocking and de-blocking operations.

The conventional method of blocking has been to spray the lens with a tinted solvent based spray, place the lens on the block and supply blocking alloy through a hole in the opposite side of the block so that it fills an area between the lens and the block. The alloy bonds the lens blank to the block, permitting it to be further processed. This is essentially the same thing which is done in producing glass lenses. However, because the plastic is more sensitive to heat than is glass, a special lead alloy which melts at 117° and is commonly called "low lead" is used as the alloy material. This is in contrast to the normal alloy having a melting point of approximately 158° F. which is used with glass. At present, only approximately 20% of prescription lenses made are made of plastic. Thus, the optical laboratory must keep both types of alloy in stock. Furthermore, at the present time the "low lead" alloy costs approximately four times more than the normal alloy.

There have been some attempts in the prior art to avoid the need for using the special "low lead" alloy. These attempts have been through the use of a heat shield or blocking disc which is disposed between the lens and the block. One such disc comprises an opaque polyethylene material which is similar to the type used for pipe wrap having an adhesive on one side. The disc with the adhesive on one side is pressed onto the lens blank after which the other exposed side then must be sprayed with a lacquer similar to the tinted lacquer used in the process described above so that the alloy will properly adhere to the disc. (Without this layer, proper adhesion of the alloy would not take place). Aside from the fact that the additional step of spraying with lacquer is still required, the use of an opaque disc makes grinding and particularly inspection more difficult. With regard to problems with spraying, it should be noted that for spraying a special hooded spraying area is required and that, even with such, the danger of fire and to personnel from breathing fumes still exists. Other attempts have been made to overcome one of these problems, i.e., the opaqueness, through the use of clear discs for use as heat shields. However, these still have had only one side coated with adhesive and require the additional spraying step if the alloy is to properly adhere. Thus, although a saving can be attained in that normal rather than special alloy may be used for blocking, an increase in cost results because of the additional step required over that of the normal process, i.e. the step of applying the disc (not to mention the additional cost of the disc) with, no other steps eliminated. Thus, the need for an improved blocking disc which permits the use of the normal alloy with plastic lenses but which simplifies rather than adds to the complexity of the blocking process is evident.

SUMMARY OF THE INVENTION

The present invention fills this need by providing a blocking disc which comprises a carrier layer of flexible, optically transparent plastic having transparent adhesive coatings on both sides thereof. The adhesive coating on one side is a coating which will stick to the plastic lens blank, but which can be stripped therefrom with a minimum of residue. The adhesive on the other side is an adhesive compatible with the normal alloy. In other words, it is an adhesive which will not flow at the temperature of the alloy, but will maintain its adhesive properties and create an adequate bond between the alloy and the blocking disc and thus, cause the lens to be rigidly attached to the lens block for the ensuing grinding, fining and polishing operations. Disclosed as preferred adhesives for these purposes are an acrylic adhesive for the side of the plastic disc which is in contact with the alloy and a rubber based adhesive for the side which contacts the lens blank.

For ease in handling and transporting, both adhesive layers contain strippable backing. Preferably, the backing for the rubber based adhesive is a silicone coated release paper. The backing for the acrylic adhesive layer is preferably a plastic release liner, for example, silicone coated polyethylene. In order to obtain good bonding of the rubber adhesive to the flexible plastic layer, which is preferably a vinyl such as polyvinyl chloride, the side to be coated with the rubber based adhesive is preferably pretreated or primed with primer coating.

The discs are manufactured by starting with an extruded vinyl layer of flexible optically transparent plastic to which is applied first a primer coating, then the rubber adhesive, and finally the silicone treated paper release liner. Thereafter, the acrylic based adhesive is applied to the other side, the silicone treated polyethylene release liner placed thereover and a kiss cut made from that side down to the paper release liner with material other than the discs so cut removed. The material can then be formed into strips so that it can be used in a conventional label dispensing machine. In operation, the individual discs are then removed from the silicone treated release paper exposing the rubber adhesive side and the disc is placed on the convex side of a lens blank which has had an axis placed thereon in conventional fashion. The plastic release treated polyethylene backing is then stripped off the other side of the blocking disc, the lens blank with the blocking disc thereon placed on and properly aligned with a lens block, whereafter the remainder of the processing takes place in conventional fashion with a normal alloy being supplied from the back side of the block to fill an area between the lens blank with the disc thereon and the block to adhere the lens and disc to the block for the grinding and polishing operations. After the lens is completed, the block is removed either by knocking it off using a shock technique or, preferably, by placing it in a hot water bath which will melt the alloy, permitting the alloy to be recovered, whereafter the disc is simply stripped off the finished lens with a minimal amount of remaining adhesive removed using an appropriate solvent such as acetone. It should be noted that, in this de-blocking step, the alloy will still be pure, whereas on the prior art method in which a lacquer is placed on the back of a lens blank or on the back of a heat shield blocking disc, lacquer became mixed in with the alloy and could possibly, particularly after a period of time, change its properties.

DETAILED DESCRIPTION OF THE INVENTION

Figure 1:
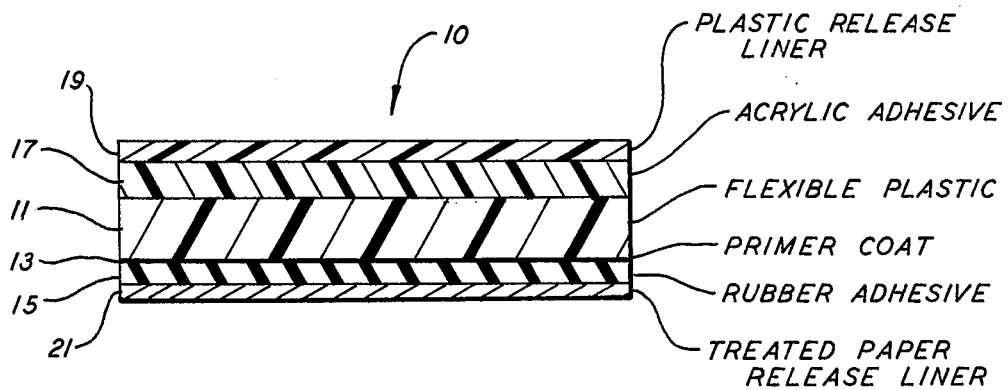
FIG. 1 is a cross sectional view through the heat shield blocking disc of the present invention.
Figures 2, 5:
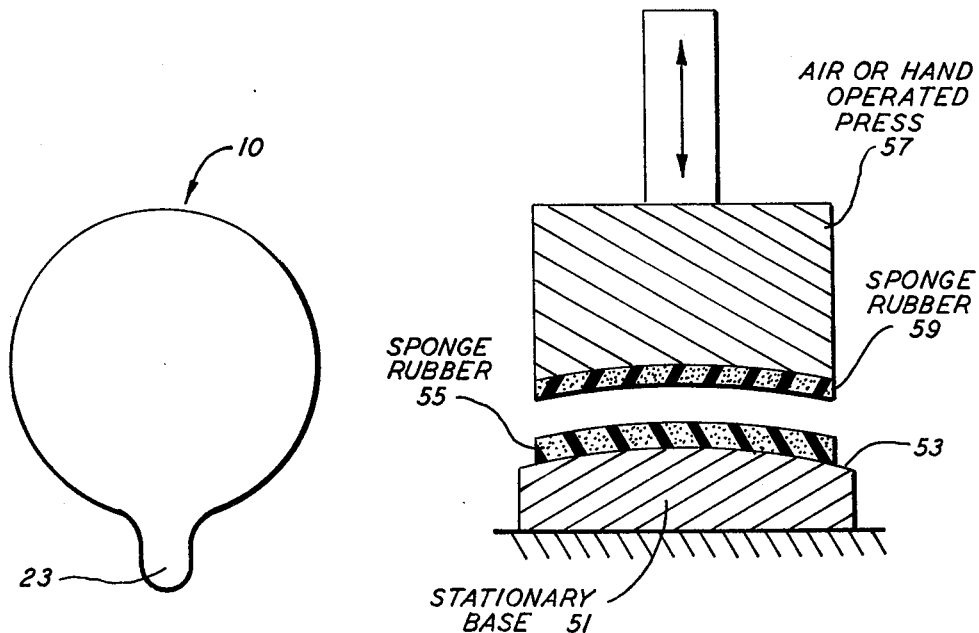
FIG. 2 is plan view of the blocking disc of FIG. 1.
FIG. 5 is a cross section partial view of a press useful in applying the blocking disc of the present invention.

The heat shield blocking and mounting disc of the present invention is shown in a cross sectional view on FIG. 1 and in a plan view on FIG. 2. The blocking disc comprises a carrier layer 11 of a flexible plastic material which is optically transparent and capable of having adhesive applied thereto. Although any flexible plastic material can be used for this purpose, the preferred material is vinyl such as polyvinyl chloride. Other materials which may be used are polyethlene film; polyurethane film and pliofilm. Various thicknesses of material ranging from 4 to approximately 10 mils may be used. However, it has been found that a thickness of the layer 11 of approximately 6 to 8 mils provides a satisfactory heat shield while at the same time giving the needed flexibility to conform to the convex side of a lens blank. Applied to one side of the carrier layer 11 is a rubber adhesive 5 having a thickness of about 0.8 to 1.2 mils. In order to get good bonding of the rubber adhesive to the plastic, a primer coating layer 13 such as a solvent rubber based primer or an aqueous latex primer is first applied to this side of the plastic carrier 11. To the other side is applied an acrylic based adhesive layer 17 having a thickness of about 0.5 to 1.0 mil. The two adhesive layers are each approximately 1 mil thick. Although, it has been found that a rubber based adhesive works well on the side 15, which, as will be seen below, is a pressure sensitive adhesive which is pressed onto the plastic lens blank, it should be recognized that any adhesive which will strip well from plastic with a minimum amount of residue may be used. Similarly, although an acrylic adhesive is preferred for the layer 17, any other adhesive layer which is compatible with a heated alloy and which will not run and lose its adhesive properties when coming into contact with the hot alloy may be used. The rubber based adhesive layer 15 is covered with a release layer or backing paper 21. In the illustrated embodiment this is a silicone treated release paper. The acrylic adhesive layer is similarly covered with a backing layer 19. In the illustrated embodiment, a treated plastic such as polyethylene treated with silicone, for example, a type of white polyethylene known as a silicone release coated polyethylene film is used. It will be recognized that other materials such as a silicone release treated paper, a polyethylene coated release paper or polyethylene film made for the purpose of its release properties can also be used for this purpose. As illustrated by FIG. 2, the blocking disc has a generally circular shape to match the shape of conventional lens blanks with a tab 23 provided to permit easy removal of the backing layers 19 and 21 when the heat shield blocking disc is used.

Figure 3:
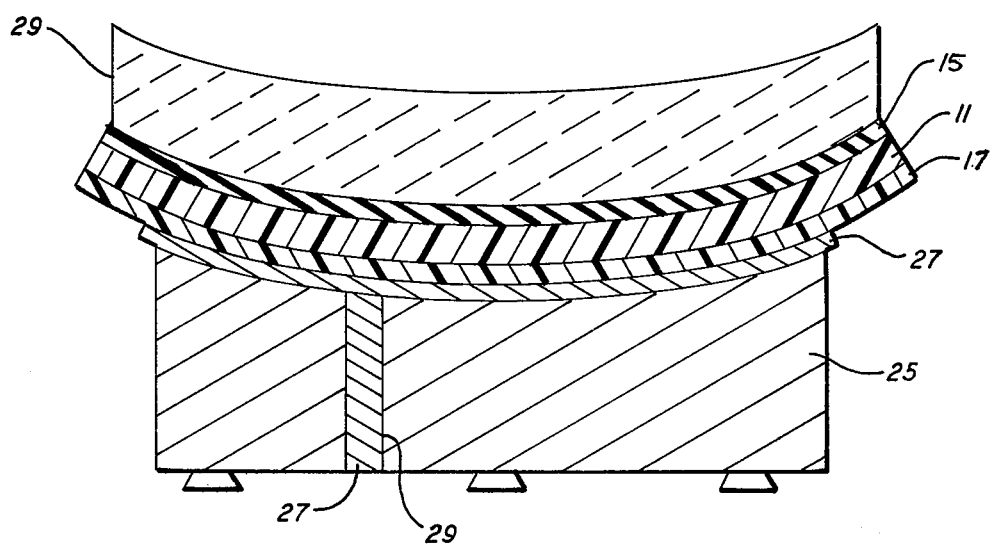
FIG. 3 is a cross sectional view of the heat shield blocking disc of the present invention when attached to a lens blank and lens block.

FIG. 3 illustrates the manner in which the heat shield blocking and mounting disc 10 of the present invention is used in preparing a lens blank for grinding and polishing. A plastic lens blank 29 is prepared in conventional fashion with an axis drawn thereon. The backing paper 21 of FIG. 1 is stripped from the disc and the disc pressed on to the lens blank 29 with the pressure sensitive rubber based adhesive adhering to the convex surface thereof. Thereafter the treated plastic backing 19 is removed from the acrylic adhesive layer 17 and the lens blank 29 with the heat shield blocking and mounting disc then placed on the lens block 25 with its axis properly aligned. Thereafter, in conventional fashion, a lead alloy 27 is flowed in through an opening 29 through the block 25 provided for that purpose, the alloy being of the conventional type normally used with glass lens blanks. Because the adhesive 17 is selected so as not to run or lose its adhesive properties when it contacts the hot alloy, a good bonding takes place between the alloy and the disc thereby solidly attaching the lens blank 29 to the block 25 so that it can be ground, fined and polished in conventional fashion.

Once the grinding, polishing, etc. is completed, the block is removed from the blank. This may be done using known techniques of applying a sharp blow, known as shocking-off, or, more preferably, will be done by placing the assembly shown on FIG. 3 including the lens blank 29, now a ground lens and much thinner, the disc and the block in a heated bath which melts the alloy and thereby breaks the adhesion between the block and disc. The disc is then simply stripped from the lens and the lens cleaned if necessary to remove any minimal amount of adhesive which remains.

In addition to permitting a normal alloy to be used with a plastic lens blank, the heat shield blocking and mounting disc of the present invention avoids the need for the step of spraying a lacquer on the back of a lens blank or a heat shield disc attached thereto. Thus, the time associated with this step and the necessary equipment with its possible dangers is eliminated. Furthermore, since the disc including its adhesive is transparent, the lens grinder can make appropriate examination of his lens in the same manner as he could in the prior art where a tinted coating on the back of the lens was used. To make it possible to observe any flaws or scratches or swirls in the lens more easily, the flexible plastic layer will preferably be tinted with, for example, a blue or green tint. An additional advantage of the blocking and mounting disc of the present invention is that it permits remounting a lens after grinding to go through some of the finer grinding and polishing steps if scratches are found. Using the prior art methods, such has not worked particularly well. However, it has been found that because of the manner in which the disc of the present invention is used, both because of its heat shielding properties and its ease of application to and removal from the lens, such remounting and further grinding and polishing is much more feasible.

Figure 4:
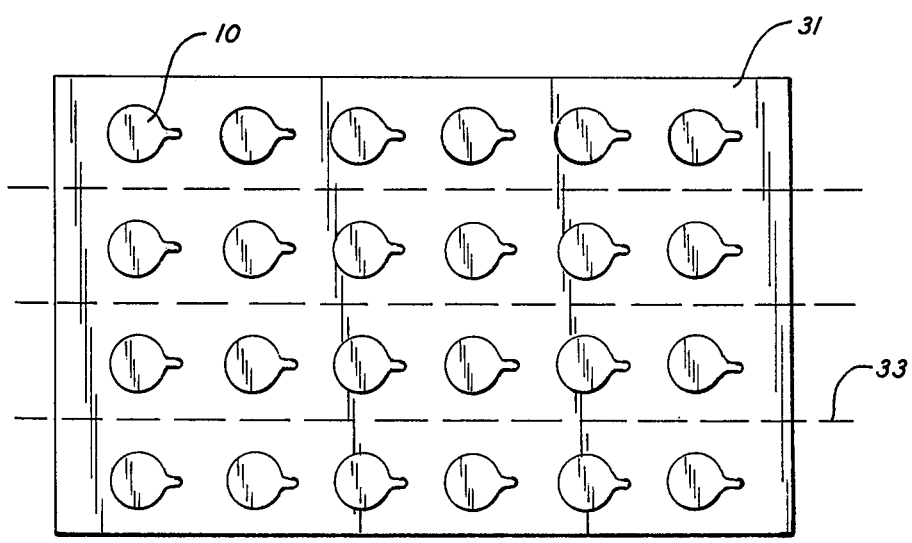
FIG. 4 is a plan view illustrating the manner in which a plurality of the discs of FIG. 2 are laid out and kiss cut.

The heat shield blocking and mounting disc of the present invention can be manufactured using conventional laminating techniques using commercially available equipment. Preferably, the discs are made in wide strips 31 such as that shown on FIG. 4. In a manufacturing process, a sheet of plastic material such as vinyl is first obtained, that sheet then coated with a prime coat layer after which the rubber adhesive is laminated on using conventional adhesive application and laminating techniques. The adhesive is then covered with the silicone release paper 21 treated on both sides for easy adhesive release. The acrylic adhesive 17 is then applied to the other side. At this point, the material can then be rolled up and stored if desired until it is ready for the next processing steps. These steps include bringing the material with its acrylic based adhesive side 17 upward in contact with the release coated polyethylene 19 and then die cutting with a kiss cut to obtain a plurality of the discs 10 as shown on FIG. 4. When kiss cutting, the layers 19, 17, 11, 13, and 15 of FIG. 1 are cut through but the layer 21 remains. After the kiss cutting all of the material other than the discs on a flat base of the treated paper 21 is removed. The sheet of material can then be further cut along the dotted lines 33 and formed into strips which can be used with a conventional label dispensing machine in which the discs can be dispensed one at a time for use in the blocking operation as described above.

Another feature of the present invention includes a refinement of the step of applying, e.g., pressing on, the disc to the lens blank. Despite the flexibility of the plastic material 11, this material is flat and the plastic lens blank is a spherical convex surface. As a result, wrinkles will appear on the surface after the application is made, particularly near the edges. In most cases, since as shown on FIG. 3 the block is smaller than the lens blank and the lens blank is normally centered, this will cause no problems. However, if the axis is offset, the portion of the disc which is creased or wrinkled can be on the concave portion of the block. In order to avoid any difficulties if this occurs, a press of the general nature of that shown in FIG. 5 can be used. Presses of this description are common to this industry. The press may be hand or air operated. This press includes a lower die 51 having a convex surface 53 approximately matching a concave surface of the lens blank 29 which is covered with a flexible layer such as a layer 55 of sponge rubber and an upper die 57 similarly having a layer of sponge rubber 59 on the bottom thereof and having a concave shape matching the convex shape of the lower die 51. In operation, the lens blank with the disc 10 placed thereover is placed on the bottom die 51 whereupon the upper die 57 is brought down in the direction of the arrow to firmly press the disc 10 on to the lens blank 29 and iron out any wrinkles. The use of the flexible material 55 and 59 avoids any damage to the lens blank or the disc in this process.

What is claimed is:

1. A method of making a lens from a lens blank comprising:
    (a) mounting a transparent flexible plastic mounting disc and heat shield having transparent adhesive on both sides thereof onto the lens blank;
    (b) placing said lens blank with said plastic disc thereon on a lens block with a space therebetween;
    (c) attaching said lens blank with said disc thereon to said lens block by supplying an alloy to the space therebetween;
    (d) carrying out grinding, fining and polishing operations on said lens block to form the lens; and
    (e) deblocking said lens.

2. The method according to claim 1 wherein said step of deblocking comprises:
    (a) placing said lens, plastic disc and lens block into a heated bath;
    (b) once the alloy has melted, removing said lens with said disc attached thereto from said bath; and
    (c) stripping said flexible plastic mounting disc from said lens.

3. The method according to claim 2 wherein said step of de-blocking comprises shocking-off said lens and then stripping said flexible plastic mounting disc from said lens.

4. The method according to claim 1, wherein said transparent flexible mounting disc is made of a vinyl plastic, said adhesive on the side contacting said lens is an adhesive which is of a type which can be cleanly stripped from a plastic lens and said adhesive on the other side of said disc is an adhesive which will bond to a blocking alloy.

* * * * *